US012652254B2

(12) United States Patent (10) Patent No.: US 12,652,254 B2
Karanth et al. (45) Date of Patent: Jun. 9, 2026

(54) SYSTEM AND METHOD FOR CLASSIFYING NETWORK DEVICES

(71) Applicant: Sandvine Corporation, Waterloo (CA)

(72) Inventors: Pradeep Karanth, Bangalore (IN); Amith Kolar Rajagopal, Bangalore (IN)

( * ) Notice: Subject to any disclaimer, the term of this patent is extended or adjusted under 35 U.S.C. 154(b) by 51 days.

(21) Appl. No.: 18/675,031

(22) Filed: May 27, 2024

(65) Prior Publication Data

US 2024/0396848 A1    Nov. 28, 2024

(30) Foreign Application Priority Data

May 27, 2023    (IN) .............................. 202311036764
May 20, 2024    (EP) .................................... 24176906

(51) Int. Cl.
   *H04L 47/2483* (2022.01)
   *H04L 69/22* (2022.01)
(52) U.S. Cl.
   CPC .......... *H04L 47/2483* (2013.01); *H04L 69/22* (2013.01)
(58) Field of Classification Search
   CPC ... H04L 47/2483; H04L 69/22; H04L 43/062; H04L 43/026
   USPC ....................................................... 709/238
   See application file for complete search history.

(56) References Cited

U.S. PATENT DOCUMENTS

2018/0145906 A1*    5/2018    Yadav ...................... H04L 45/38
2018/0247188 A1*    8/2018    Wong ........................ G06N 3/08

2021/0120400 A1*    4/2021    Li ............................. G06N 3/04
2023/0074934 A1*    3/2023    Li ........................... H04L 69/164
2023/0216947 A1*    7/2023    Bernardi ................. H04L 67/10
                                                                         713/150

OTHER PUBLICATIONS

Rajarshi Roy Chowdhury et al., "Network Traffic Analysis based IoT Device Identification", Oct. 2020 BDIOT '20: Proceedings of the 2020 4th International Conference on Big Data and Internet of Things, pp. 79-89, https://dl.acm.org/doi/10. (Year: 2020).*
Adam Cassar, "TLS Fingerprinting", Feb. 2023, Peakhour, https://www.peakhour.io/blog/tls-fingerprinting/ (Year: 2023).*
Narges Yousefnezhad et al., "Automated IoT Device Identification Based on Full Packet Information Using Real-Time Network Traffic", Apr. 2021, mdpi, https://doi.org/10.3390/s21082660 (Year: 2021).*

(Continued)

*Primary Examiner* — Ruolei Zong
(74) *Attorney, Agent, or Firm* — Amarok IP Inc.; Neil W. Henderson

(57)                ABSTRACT

A method and system for classifying a device accessing a computer network. The method including: determining fields of interest that are indicators for classifying the device; reviewing a network traffic flow associated with the device; extracting field/parameter values from a packet associated with the network traffic flow; comparing the extracted field/parameter values with values of the fields of interest to determine at least one device attribute; and classifying the device associated with the network traffic flow based on the comparison. The header fields/parameters may include application name and/or fields/parameters available in a TLS header. The system includes a processor, memory, and software modules and engines that implement the method above.

17 Claims, 9 Drawing Sheets

(56)  References Cited

OTHER PUBLICATIONS

Martin Husák et al., "HTTPS traffic analysis and client identification using passive SSL/TLS fingerprinting", Feb. 2016, EURASIP Journal on Information Security (Year: 2016).*

Unknown, "How TLS Fingerprinting Reinforces DataDome's Protection", Oct. 2022, DataDome, https://datadome.co/engineering/how-tls-fingerprinting-reinforces-datadomes-protection/ (Year: 2022).*

* cited by examiner

18 — The Internet

400 — Active Network
Intelligence Element Inspecting the
traffic & calculating all Network
stats.

16 — Operator GW

14 — Core Network

12 — Subscriber

| | | | | | |
|---|---|---|---|---|---|
| 2233 9.992233 | 192.109.1.6 | 136.119.62.146 | QUIC | r3---sn-cisgup-cag6.googlevideo.com | 1250 Initial, DCID-eS027cf61ba5d6el, P1 |
| 2206 9.999503 | 116.119.62.146 | 192.168.1.6 | QUIC | | 1250 Handshake, SCID-eS027cf61ba5d6el |
| 2206 9.999503 | 116.119.62.146 | 192.168.1.6 | QUIC | | 1250 Handshake, SCID-eS027cf61ba5d6el |
| 2206 9.999503 | 116.119.62.146 | 192.168.1.6 | QUIC | | 1250 Handshake, SCID-eS027cf61ba5d6el |
| 2206 9.999503 | 116.119.62.146 | 192.168.1.6 | QUIC | | 1250 Handshake, SCID-eS027cf61ba5d6el |
| 2206 9.999503 | 116.119.62.146 | 192.168.1.6 | QUIC | | 390 Protected Payload (xyo) |
| 2299 10.004315 | 192.168.1.6 | 116.119.62.146 | QUIC | | 49 Handshake, DCID-eS027cf61ba5d6el |
| 2200 20.004517 | 190.104.1.6 | 116.119.62.146 | QUIC | | 49 Handshake, DCID-eS027cf61ba5d6el |
| 2201 20.006270 | 192.104.1.6 | 116.119.62.146 | QUIC | | 49 Handshake, DCID-eS027cf61ba5d6el |
| 2202 20.011344 | 192.104.1.6 | 116.119.62.146 | QUIC | | 91 Handshake, DCID-eS027cf61ba5d6el |

```
Session ID Length: 0
Cfpher Suites Length: 0
> Cfpher Suites (3 Suftes)
Compression Methods Length:2
> Compression Methods (1 method)
Extensions Length: 202
> Extension: Supported_groups (len-0)
> Extension: application_settings (len-5)
> Extension: Supported_versions (len-3)
> Extension: application_layer_protocol_negotiation (len-5)
> Extension: psk_key_exchange_modes (len-2)
> Extension: Compress_certificate (len-3)
∨ Extension: quic_transport_parameters (len-117)
      Type: quic_transport_parameters (57)
      Length: 117
      > Parameter: initial_max_streams_uni (len-2) 200
      > Parameter: initial_source_connection_id (len-0)
      > Parameter: initial_max_data (len-4) 15728640
      > Parameter: max_datagram_frame_size (len-4) 65536
      > Parameter: initial_max_stream_data_bidi_local (len-4) 6291456
      > Parameter: GREASE (len-9)
      > Parameter: max_udp_payload_size (len-2) 1472
      > Parameter: initial_max_stream_data_bidi_remote (len-4) 6291456
      > Parameter: max_idle_stream (len-4) 20500 rn
      > Parameter: google_connection_options (len-20)
      > Parameter: version_information (len-17)
      > Parameter: initial_max_streams_idle (len-2) 100
      > Parameter: google_quiz_version (len-4)
      > Parameter: initial _max _stream_data_uni (len-4) 6291456
> Extension: key_share (len-38)
> Extension: signature_algorithms (len-20)
∨ Extension: server_name (len-41)
      Type: server_name (0)
      Length: 41
      ∨ Server Name Indication extension
            Server Name list length:  39
            Server Name Type:  host_name (0)
            Server Name length:  36
            Server Name:  rr3---sn-cisgup-cag6.googlevideo.com
```

Receive network traffic — 605

Determine application — 610

Extract Field Values — 615

Classify OS — 620

Manage Network — 625

Initialize System — 905

Receive network traffic — 910

Extract and Monitor Header Fields/Parameters — 915

Determine indicators — 920

Test indicators — 925

Create lookup entries — 930

SYSTEM AND METHOD FOR CLASSIFYING NETWORK DEVICES

RELATED APPLICATION

The present disclosure claims priority to Indian patent application No. 202311036764 filed May 27, 2023, and European Patent Application No. 24176906.6 filed May 20, 2024 which is hereby incorporated herein in its entirety by reference.

FIELD

The present disclosure relates generally to classifying computer network traffic. More particularly, the present disclosure relates to a system and method for classifying devices accessing a computer network, including operating system and device type.

BACKGROUND

Network traffic continues to increase all over the world. Further, Internet traffic is increasingly becoming encrypted from end to end. At the same time, network operators need to understand who is accessing the network and from what type of device to allow the operators to make decisions regarding network management and the like. For example, accurately identifying attributes of the user device from an encrypted traffic flow can assist a network operator in managing a network, including, for example, providing an acceptable level of quality of service and quality of experience to users and subscribers of the network. It is particularly helpful if the attributes can be identified in a fast and computationally efficient manner.

While there have been some developments in classifying devices within Transmission Control Protocol (TCP) traffic flows, there does not yet appear to be any method for classifying devices for the wide variety of traffic transmitted over User Datagram Protocol (UDP). Most UDP traffic does not easily allow for classifying devices using known TCP methodologies because UDP does not make use of a user agent in its payload in plaintext format. UDP has a growing presence in many networks as various network sites and/or applications have begun using UDP and, in particular, IETF QUIC traffic for delivering their content instead of TCP. As such, it is important to also be able to classify UDP traffic. Further, in conventional methods of classifying devices using TCP traffic, the cost of device classification can be significant because of the need to use machine learning based classification or the like.

One of the attributes that is shared over various types of networked devices is the operating system being used on the device. For mobile devices, this may include Android™ and iOS™. As the operating system can determine many features of a device, the operating system is a useful attribute to understand in analyzing network traffic.

It is, therefore, desirable to provide an improved method and system for classifying the network devices accessing the computer network.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for classifying a device accessing a computer network, the method including: determining fields of interest that are indicators for classifying the device; reviewing a network traffic flow associated with the device; extracting field/parameter values from a packet associated with the network traffic flow; comparing the extracted field/parameter values with values of the fields of interest to determine at least one device attribute; and classifying the device associated with the network traffic flow based on the comparison.

In some cases, the method may further include: determining at least one traffic action associated with the device classification; and applying the at least one traffic action to the network traffic flow.

In some cases, the extracted field/parameter value may include an application related to the traffic flow.

In some cases, the fields of interest may be based on the application associated with the traffic flow.

In some cases, the extracted field/parameter values may be extracted from a Transport Layer Security (TLS) header.

In some cases, the classifying the device includes determining a general device type or an operating system of the device. In this case, the operating system may be classified as one of: Windows OS, Android OS, and iOS.

In some cases, the fields of interest may include standardized fields.

In some cases, the fields of interest may include either maximum idle time or a maximum payload size.

According to another aspect, there is provided a system for classifying a device accessing a computer network, the system comprising a processor and memory and the processor executes computer-readable instructions from the memory to enable the functionality of the following modules/engines: a monitoring module configured to determine fields of interest that are indicators for classifying the device; a packet processing engine configured to review a network traffic flow associated with the device; a device classification engine configured to: extract field/parameter values from a packet associated with the network traffic flow; compare the extracted field/parameter values with values of the fields of interest to determine at least one device attribute; and classify the device associated with the network traffic flow based on the comparison.

In some cases, the device classification engine may include: an application recognition module configured to determine an application based on the traffic flow; and a field/parameter extraction/lookup module configured to classify a device based on the application and extracted field/parameters values.

In some cases, the application recognition module may be configured to determine the fields of interest based on the application associated with the traffic flow.

In some cases, the system may further be configured to: determine at least one traffic action associated with the device classification; and apply the at least one traffic action to the network traffic flow.

In some cases, the device type may be classified based on one of a general device type or an operating system of the device. In this case, the operating system may be classified as one of: Windows OS, Android OS, and iOS.

In some cases, the field/parameter extraction/lookup module may be configured to determine standardized fields in the header.

In some cases, the field/parameter extraction/lookup module may be configured to determine maximum idle time or a maximum payload size in the header.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 2 illustrates an example TLS1.2 header;

FIG. 7 is an example of header fields/parameters for device classification according to an embodiment;

DETAILED DESCRIPTION

As noted above, some of the top applications used on the Internet have been using User Datagram Protocol (UDP) (and in particular, IETF QUIC) for traffic delivery. In particular, applications such as YouTube™, Instagram™ and Facebook™ use IETF QUIC based UDP traffic to deliver content. At present, there does not yet appear to be any method for classifying devices for the wide variety of traffic transmitted over UDP. While it may be possible to apply machine learning tools such as those used for Transmission Control Protocol (TCP) traffic to UDP traffic, it would be preferable to determine a more computationally efficient approach that will assist in both UDP and TCP traffic device classification. Even if all device characteristics and/or attributes cannot be identified or classified, attributes such as the Operating System (OS) or form factor for devices on the network would be a good place to start as this would provide a general classification for the network devices.

Generally speaking, the method and system herein provide a method and system for classifying/detecting a traffic flow initiator's network device from network traffic. The traffic flow initiator may be a client or server within a network but the initiator device of interest to network operators is typically the client. In particular, it was unexpectedly determined that predetermined fields in header information in a traffic flow have values that can be used as indicators of device attributes such as generalized device type, operating system, or the like. As such, embodiments of the system and method herein make use of these fields to compare the values of those fields to values in a look-up table to determine device attributes, such as the OS or other attributes, involved in sending the traffic flow.

Figure 1:
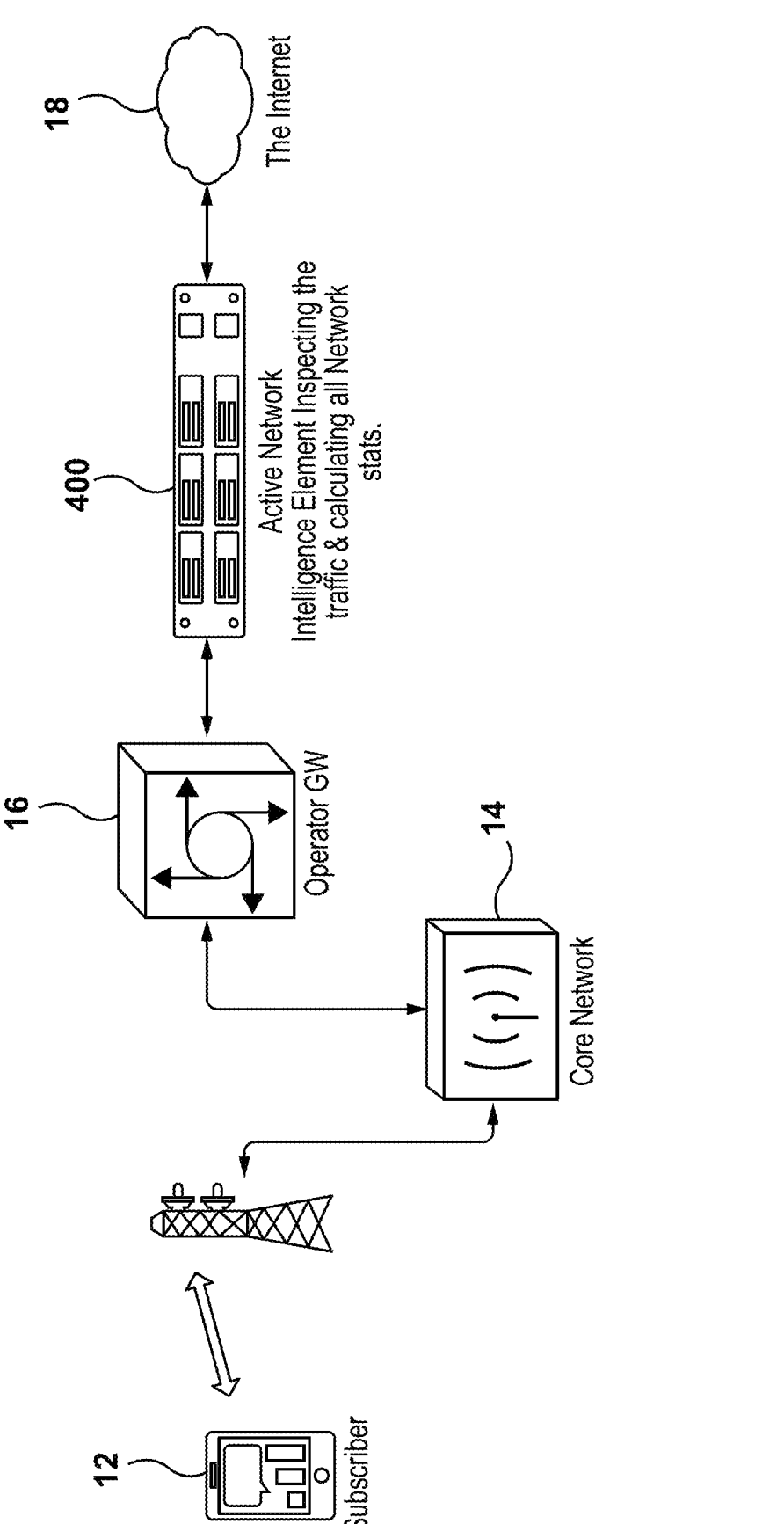
FIG. 1 illustrates a network environment for embodiment of the system and method herein.

FIG. 1 is a schematic of a network configuration in which a plurality of subscribers accesses an operator network typically by initiating a traffic flow. FIG. 1 illustrates wireless access via a ore network 14, by a smart device 12 such as a phone or tablet, but it will be understood that other wired or wireless devices will be included. The operator network will typically include an operator gateway 16, which passes the traffic flow to a classification system 100 according to an embodiment herein. The classification system 400 then passes the traffic flow to an external network 18 (for example, the Internet or the like) for handling and response. It will be understood that the classification system may be within the operator network or between the operator network and the external network.

In UDP-IEFT QUIC traffic flows, there is a Transport Layer Security (TLS) 1.2 header for each packet. While these packets and headers are generally encrypted, the TLS 1.2 header is intended to be encrypted in a known way that can be decrypted in a straight-forward manner based on the IETF QUIC standard. The TLS 1.2 header includes information about the packet, including a Server Name Indication (SNI) value and various extensions and parameters. FIG. 2 illustrates an example TLS 1.2 header for a UDP-IEFT QUIC traffic flow for a YouTube™ application. Similar headers are found in packets for other popular applications. FIG. 2 illustrates general TLS header information for IETF QUIC traffic to illustrate field that are available to review.

Figure 3:
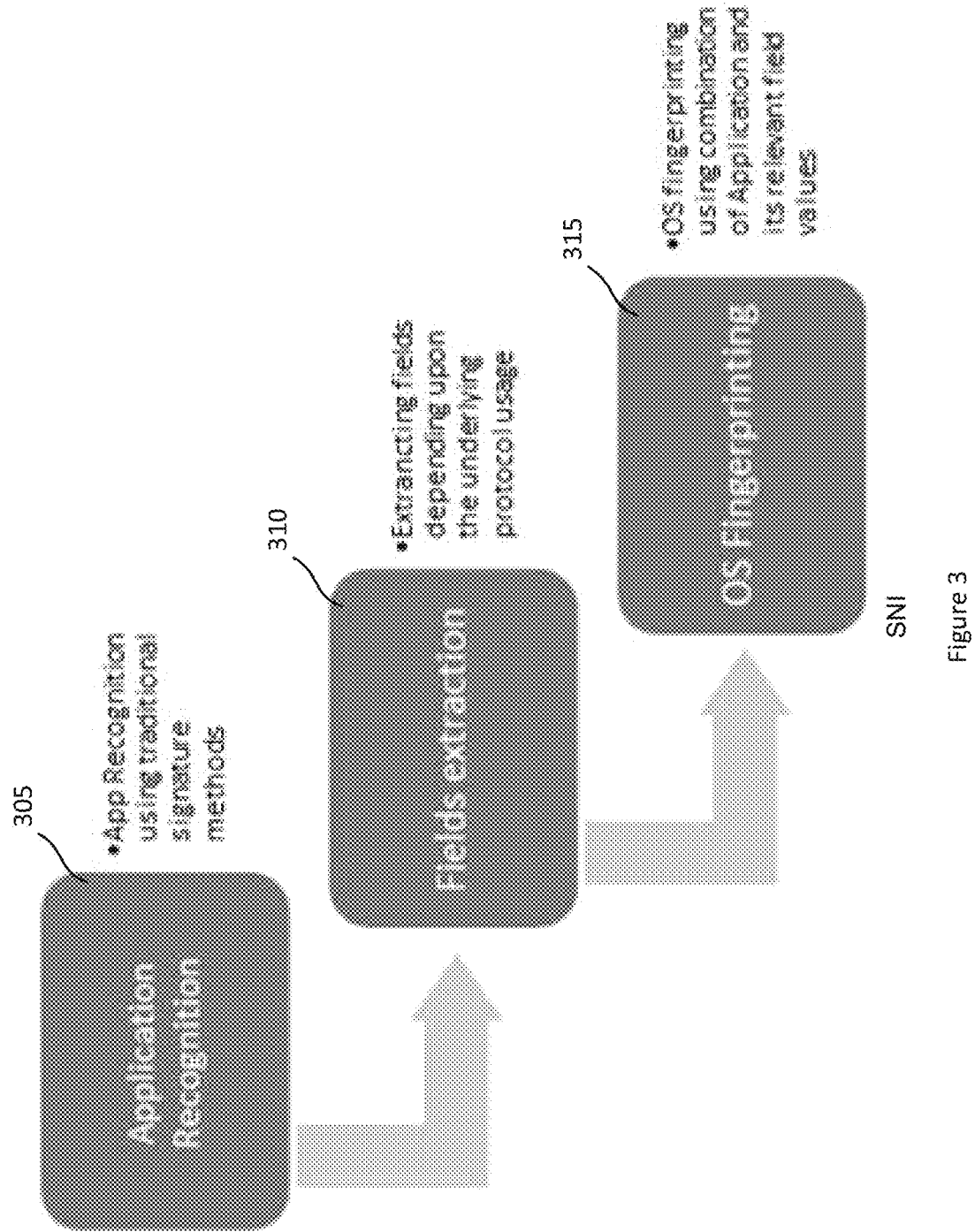
FIG. 3 illustrates a generalized method for classification according to an embodiment.

FIG. 3 illustrates a generalized method for device classification for network devices according to an embodiment herein. The method includes: application detection 305, which may be optional in some embodiments or for some functionality within embodiments; application specific fields extraction 310, which may include decryption; and using application and field values to determine at least one device attribute 315, such as the OS, of the traffic flow initiator device. Using a streamlined approach to device classification allows the method to classify a large set of initiator devices to at least a general level quickly, provide early device classification for network management, and help improve the accuracy of device classification by providing an alternate method for classification.

Figure 4:
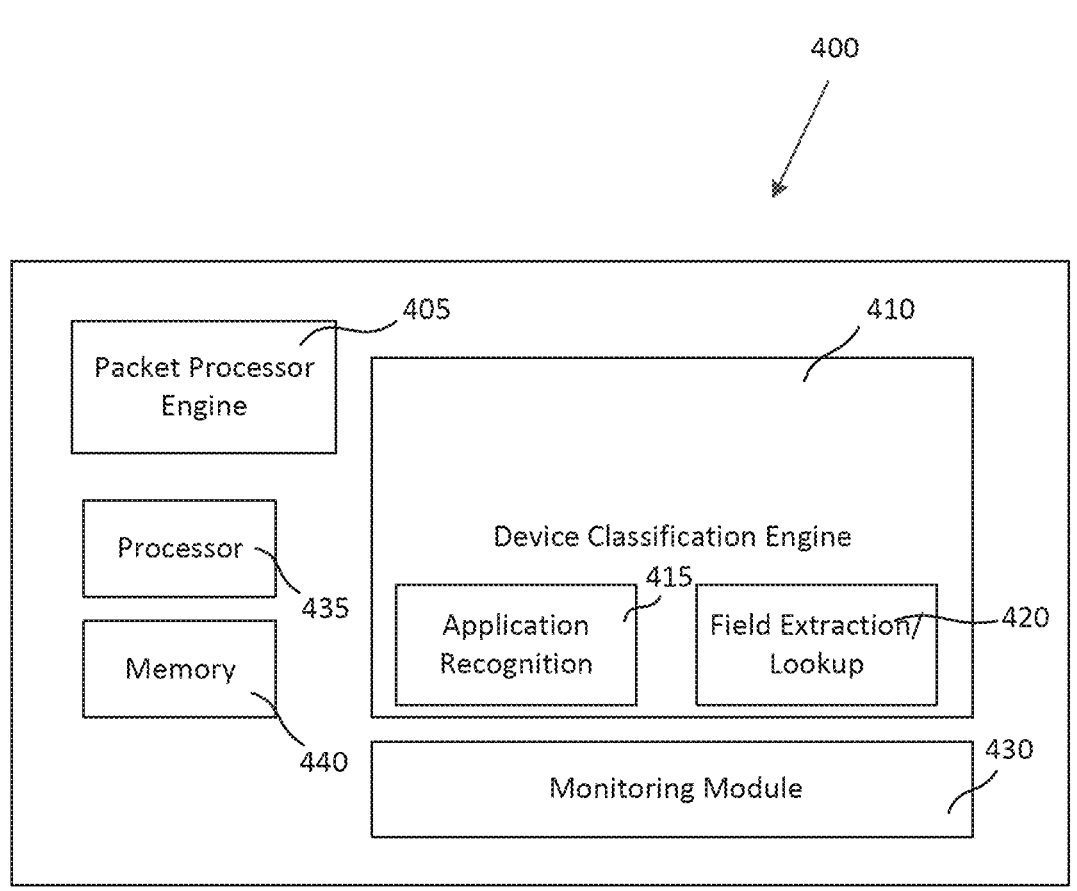
FIG. 4 illustrates a system for classification according to an embodiment.

FIG. 4 is a block diagram of an embodiment of a device classification system 400 using the method of FIG. 3. The device classification system includes a packet processor engine 405, a device classification engine 410, a monitoring module 430, a processor 435 and memory 440. In some cases, the system 400 may include a plurality of processors or memories, for example, including at least one processor and memory per module or per engine or the like. In some cases, the system 400 may be distributed and may be housed in a plurality of network devices. In other cases, the system may reside in a single network device. In some cases, the memory 440 may be included as an internal component of the system. In other cases, the memory component may be housed externally or in a cloud and may be operatively connected to the system and the components of the system. The processor 435 is configured to execute instructions stored in the memory component 440 in order to provide the ability to the engines/modules to execute their functions.

The packet processor engine 405 is intended to receive and review the traffic flow. In some cases, the packet processor engine 405 may include a deep packet inspection module. The packet processor engine 405 may extract and derive flow attributes associated with the traffic flow as described in further detail herein. The packet processor engine 405 may further determine if the traffic is encrypted or non-encrypted and whether the traffic flow has an accessible User Agent string to be reviewed.

The device classification engine 410 may include an application recognition module 415 and a field extraction/lookup module 420. The application recognition module 415 can be configured to determine an application of the packet based on information from the packet processor engine 405. The field extraction/lookup module 420 can be configured to extract the values of relevant fields/parameters or the like from the packet and use those values together with the application to determine the OS for the packet and classify the packet as such. In some cases, the application/application name may in fact be considered a field/parameter that is available from a header or header-like data. Once the device classifier engine 410 determines the device classification, the device classification engine 410 may further review and determine whether any traffic policy would apply to the traffic flow based on the device classification. In some cases, the device classification engine 410 may implement a traffic policy directly or may update traffic policies on other devices for application to the traffic flows.

The monitoring module 430 can be configured to monitor traffic flows over a longer period of time to determine fields that can be used to differentiate device attributes, such as OS or the like, within traffic flows and update lookup tables based on such monitoring. For example, if the monitoring module 430 determines that a field consistently (for example, for a predetermined period of time, at a predetermined confidence level, or the like) indicates a particular OS for an application, the monitoring model 430 can include the field and associated value in an appropriate lookup table.

As noted above, in some cases, the system 400 may be configured to manage traffic flow of user devices, such as, for example, perform traffic actions based on the device classification. Similarly, the system may determine appropriate traffic management policies to apply to the traffic flow depending on the device classification together with other characteristics of the flow or the like.

Figure 5:
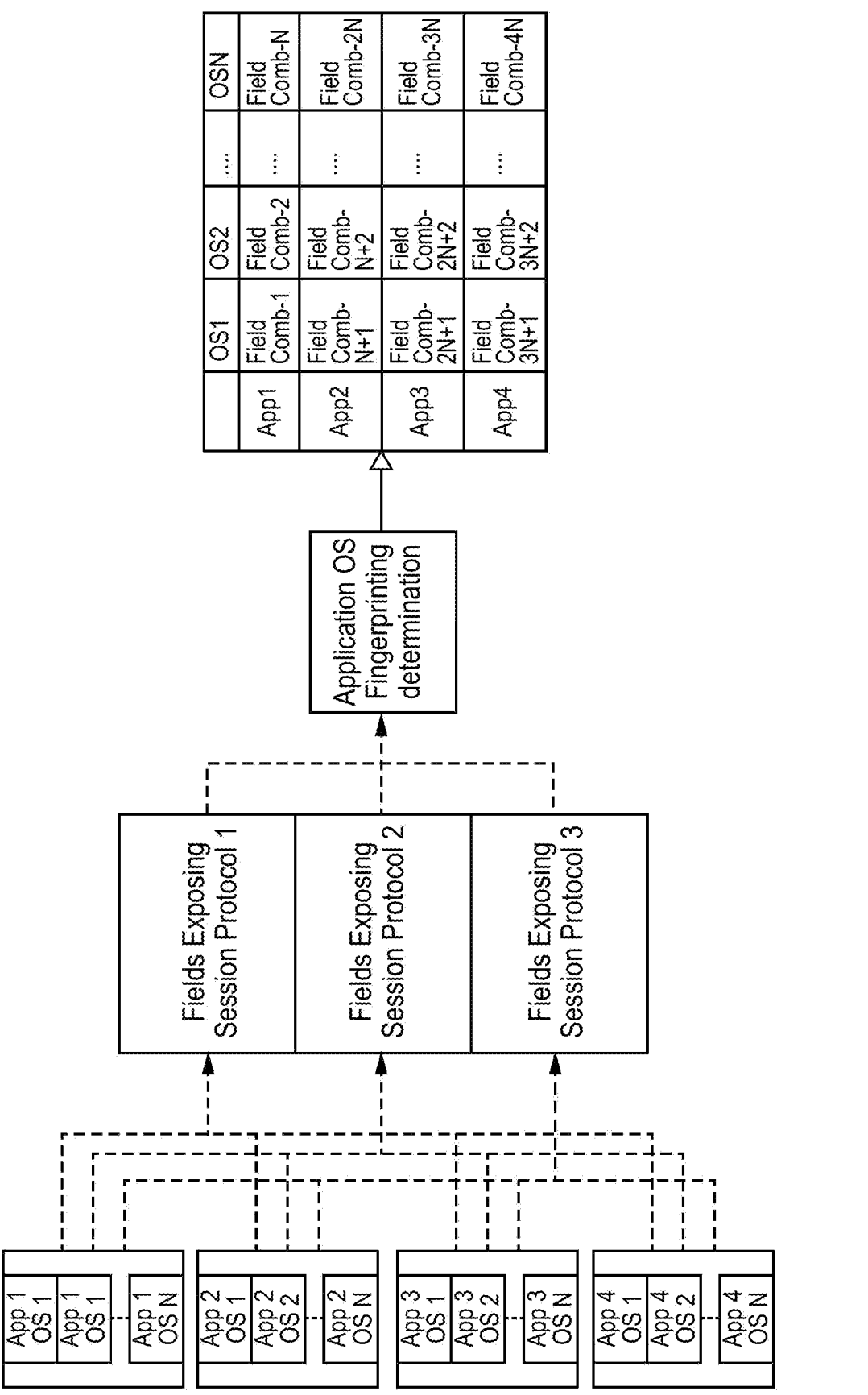
FIG. 5 illustrates development of a lookup table according to an embodiment.

FIG. 5 is an example of analysis of packets by embodiments of the system and method described herein. Packets in a traffic flow can be characterized by application (App1, App2, ... ). It is assumed that these various packets will be from various types of OS (OS 1, OS 2, .... OS N). The packets are then reviewed to extract values from the fields that have been identified as being useful to classify OS. Lastly, a lookup table can be used to determine the OS based on the application and the extracted values from the fields. As noted in FIG. 5, the identification of an OS may be based on a value in a single field or a combination of values in various fields. Various logical operators may also be used when combining fields to provide the OS classification.

Figure 6:
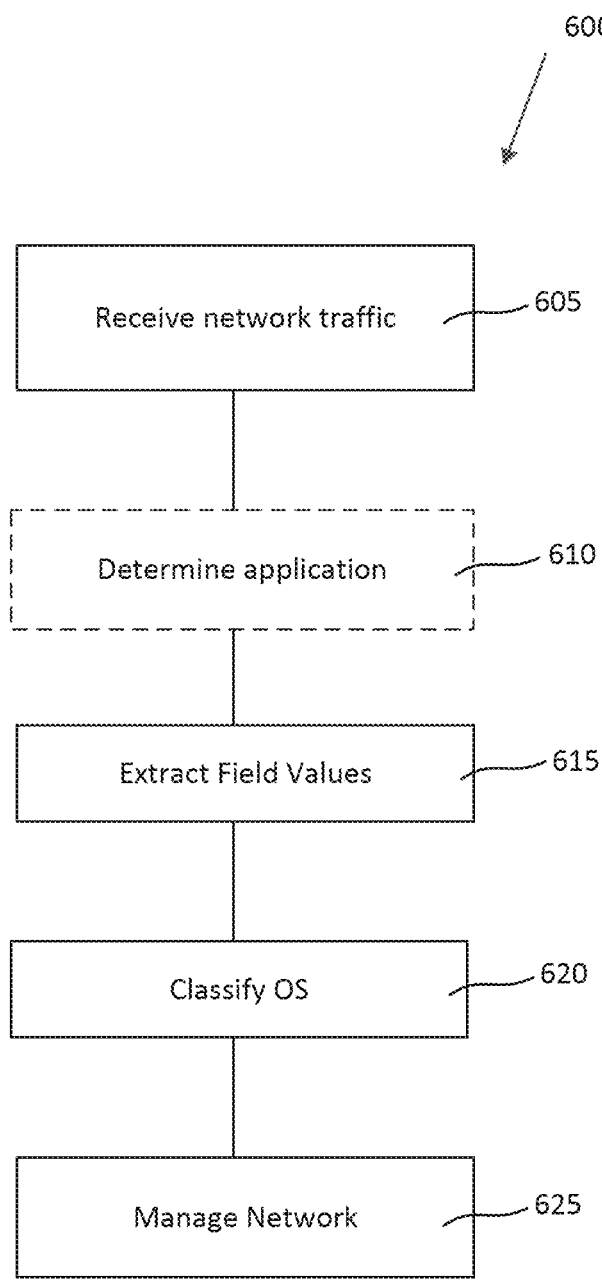
FIG. 6 illustrates a method for classification according to an embodiment.

FIG. 6 illustrates a method 600 to classify network devices according to an embodiment. The system (for example, the packet processor engine) receives and reviews network traffic flows, at 605, and determines if the traffic (or in particular a packet) is associated with a new flow. If a new flow, a packet can optionally be inspected to determine the application in use, at 610. The determination of an application in use can be made by known signature methods if or when this is needed for the classification process. At 615, the values of predetermined fields of interest are extracted from each new network flow, for example, by the device classification engine. At 620, the values extracted are used by the device classification engine, sometimes together with the application in use, where applicable, to lookup the, for example, OS of the network device associated with the traffic flow. At 625, the device classification engine or the system may modify traffic policies or the like based on the device attributes (such as types of OS) being used on the network.

As a specific example illustrating the features of embodiments of the system and method herein, the system can receive and review network traffic for UDP-IETF QUIC traffic and extract information from a packet/header by decrypting where necessary and/or signature methods. For example, the system can determine an application using conventional signature measures and decrypt the TLS header based on the QUIC standard. The system can then determine if the traffic/packet includes one or more standardized fields, such as the "quic_tranport_parameters", in the decrypted TLS header. If the packet includes a standardized field of interest, e.g. the "quic_tranport_parameters", there are a variety of parameters that may be specified. FIG. 7 illustrates an example of parameters that appear under "quic_tranport_parameters". One or more or a combination of the values of these parameters can be used to determine device attributes such as the OS of the initiator device for the traffic.

For example, some applications under the Alphabet™ group of companies, such as YouTube™, include a parameter "google_connection_options" under the "quic_tranport_ parameters" field. The value of this parameter "google_connection_options" is distinct depending on whether a device is using the Android™ OS, the Apple™ iOS™ or a more generic browser in general (across platforms). Using the distinct value of the "google_connection_options", it is possible to recognize and/or classify the OS for this traffic. Table 1 below shows a mapping of OS to parameter at the time of preparation of this disclosure:

TABLE 1

| OS | Google Connection Option value |
|---|---|
| Any device browsers | Length == 4 && value == RVCM |
| Android App | Length == 20 && value == RVCMBWRS5RTOAKD4AKDU or Length == 24 && value == BWRSTLPRRVCM5RTOAKD4AKDU |
| iOS Device App | Length == 16 && value == ACKDAKDURVCMBWRS |

On the other hand, the application Instagram™ has differences in the values for parameters such as "max_udp_ payload_size" and "max_idle_timeout" that can be used to determine the OS associated with the device using the application. Table 2 illustrates a mapping of OS to values of these parameters at the time of preparation of this disclosure:

TABLE 2

| OS | max_idle_timeout | max_udp_payload_size |
|---|---|---|
| Android App | 30000 | 1280 |
| iOS Device App | 60000 | 1255 |
| Any device browsers | 30000 | 1472 |

In some cases, there may be fields that can be used alone or in combination to determine whether the traffic is coming from a particular type of device, such as a smart phone or the like, or from another type of computing device. For example, the Facebook™ application includes the fields/ parameters "max_udp_payload_size" and "max_idle_timeout", the values of which can indicate if the traffic is related to a smart phone or other computing device. Table 3 illustrates a mapping of general device type to values of these parameters at the time of preparation of this disclosure:

| Device Type | max_idle_timeout | max_udp_payload_size |
| --- | --- | --- |
| Smart Phone | 30000 | 1452 |
| Others | 30000 | 1472 |

In some embodiments, the definition of a "traffic flow" includes the following properties: the traffic flow occurs between two endpoints, with one endpoint being an initiator; and a new traffic flow is generally tracked when a packet is to be counted that does not match the attributes of an existing traffic flow.

In embodiments herein, the system/method can be structured such that every packet that the system receives may pass through the packet processor engine but may not necessarily be directed to the device classification engine. The extracted fields are shared from the packet processor engine 105 to the device classification engine. The device classification engine 110 may be used to classify device attributes when the traffic is either encrypted or unencrypted.

The levels/categories of device classification may include, for example, Android™ device, Apple™/IOS™ device or Windows™ device, mobile device, personal computer (PC), Other, or the like.

Figure 8:
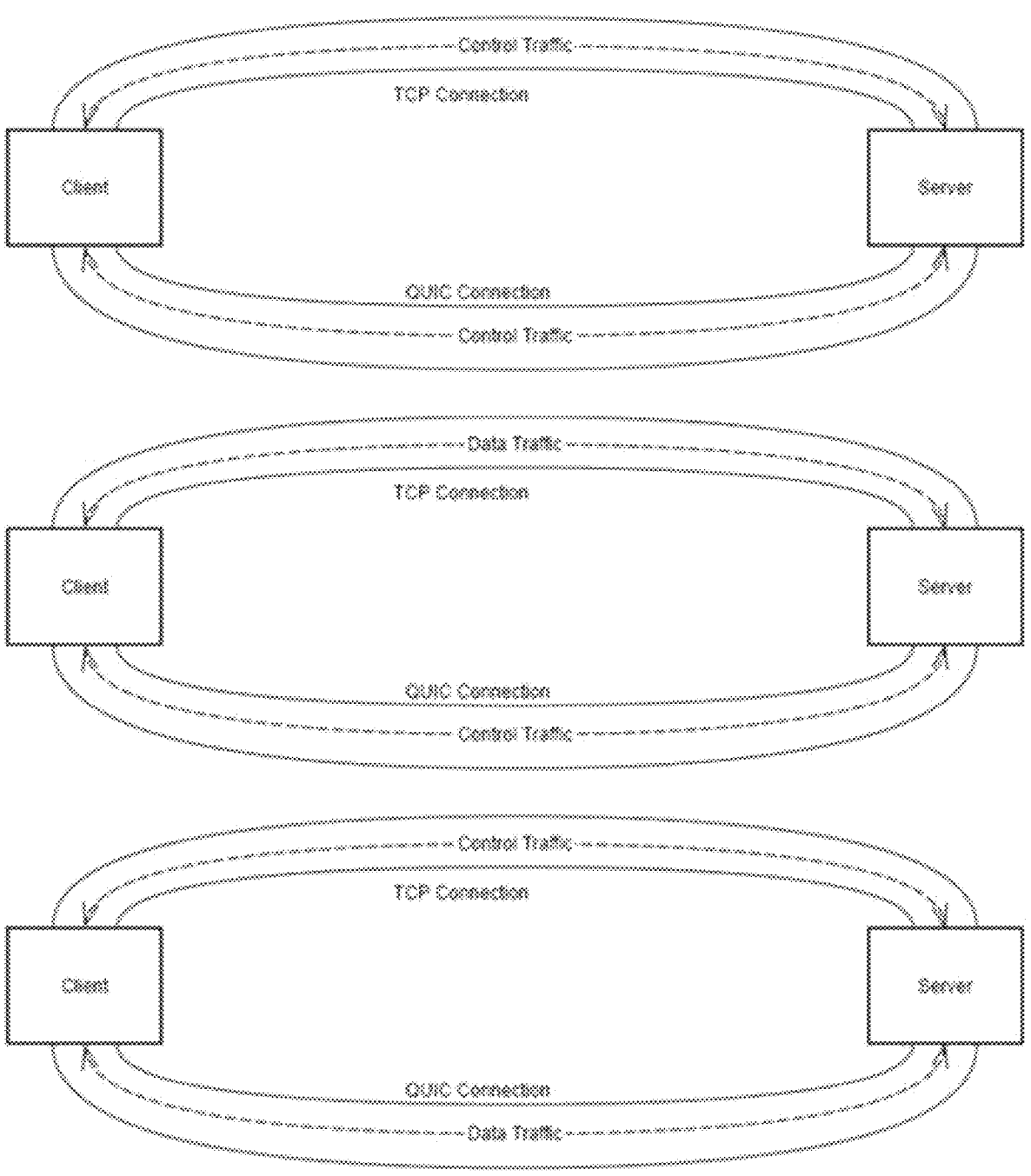
FIG. 8 is an example of traffic flows using both TCP and UDP connections.

FIG. 8 illustrates an example of how embodiments of the system and method herein can assist with classifying device attributes in TCP traffic flows. Recently, many network operators are migrating to TLS 1.3 headers and using QUIC content delivery. In particular, various applications are now structured to allow the client to establish TLS1.3/TLS1.2 connections over both TCP and UDP-QUIC to the same server (server IP address) and then both connections remain active (for at least some amount of time) such that data for the application involved can be provided on either of the connections (TCP or UDP). FIG. 8 illustrates various scenarios that may occur when both connections are available. The client/server can send TCP or UDP-QUIC packets/traffic flows. Since there are two connections, information about the client/initiator device on the UDP side that is determined/classified by embodiments herein can be included with data for the TCP side of the related traffic flow. For example, the client IP/server IP combination or client IP/server name combination or even client IP/short duration connection correlation or the like can be used to share the information.

Figure 9:
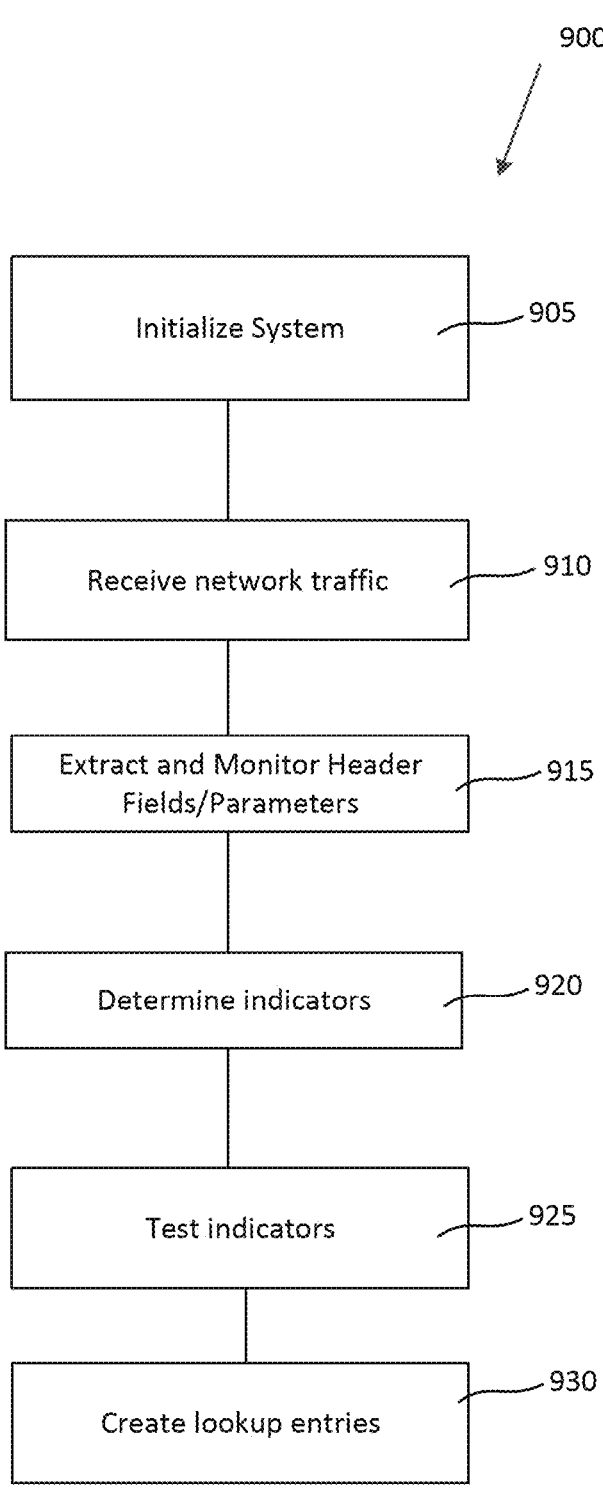
FIG. 9 is a method of indicator field/parameter discovery according to an embodiment.

FIG. 9 illustrates an embodiment of a method 900 of determining fields for use in classifying a device. At 905, the system is initialized. The packet processor engine receives network traffic, at 910 and processes network traffic flows by extracting header data, at 915. The monitoring module receives input of header data from the packet processor engine. The monitoring module extracts and monitors header fields and parameters at 920. The monitoring module determines flows that have a smaller number of field/parameter values that repeat over a plurality of traffic flows and determines that these fields/parameters may be indicators of device attributes, at 925. The system tests which fields/parameters may serve as indicators based on one or more known traffic flows from known devices. The system then creates/prepares the lookup tables to correlate the field/parameter values to device attributes, at 930.

In the preceding description, for purposes of explanation, numerous details are set forth in order to provide a thorough understanding of the embodiments. However, it will be apparent to one skilled in the art that these specific details may not be required. It will also be understood that aspects of each embodiment may be used with other embodiments even if not specifically described therein. Further, some embodiments may include aspects that are not required for their operation but may be preferred in certain applications. In other instances, well-known structures may be shown in block diagram form in order not to obscure the understanding. For example, specific details are not provided as to whether the embodiments described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with other modules and elements, including circuitry or the like, to perform the described tasks.

The above-described embodiments are intended to be examples only. Alterations, modifications and variations can be effected to the particular embodiments by those of skill in the art without departing from the scope, which is defined solely by the claim appended hereto.

What is claimed is:

1. A method for classifying a device accessing a computer network, the method comprising:
   determining fields of interest that are indicators for classifying the device;
   reviewing a network traffic flow associated with the device, wherein the network traffic is a UDP traffic flow;
   extracting and decrypting field values from a packet associated with the network traffic flow, wherein the extracted field values comprise an application standardized field from a header of the traffic flow;
   comparing the extracted field values with values of the fields of interest to determine at least one device attribute; and
   classifying the device associated with the network traffic flow based on the comparison.

2. The method for classifying a device according to claim 1, further comprising:
   determining at least one traffic action associated with the device classification; and
   applying the at least one traffic action to the network traffic flow.

3. The method for classifying a device according to claim 1, wherein the extracted field/parameter value includes an application related to the traffic flow.

4. The method for classifying a device according to claim 1 wherein the fields of interest are based on the application associated with the traffic flow.

5. The method for classifying a device according to claim 1, wherein the extracted field values are extracted from a TLS header.

6. The method for classifying a device according to claim 1, wherein classifying the device comprises determining a general device type or an operating system of the device.

7. The method for classifying a device according to claim 6, wherein the operating system is classified as one of: Windows OS, Android OS, and iOS.

8. The method for classifying a device according to claim 1 wherein the fields of interest comprise standardized fields.

9. The method for classifying a device according to claim 1 wherein the fields of interest comprise either maximum idle time or a maximum payload size.

10. A system for classifying a device accessing a computer network, the system comprising a processor and memory and the processor executes computer-readable instructions from the memory to enable the functionality of the following modules and engines:

a monitoring module configured to determine fields of interest that are indicators for classifying the device;

a packet processing engine configured to review a network traffic flow associated with the device, wherein the network traffic is a UDP traffic flow;

a device classification engine configured to:

extract and decrypt field values from a packet associated with the network traffic flow, wherein the extracted field values comprise an application standardized field from a header of the traffic flow;

compare the extracted field values with values of the fields of interest to determine at least one device attribute; and classify the device associated with the network traffic flow based on the comparison.

11. The system for classifying a device according to claim 10, wherein the device classification engine comprises:

an application recognition module configured to determine an application based on the traffic flow; and a field extraction and lookup module configured to classify a device based on the application and extracted field/parameters attributes.

12. The system for classifying a device according to claim 11 wherein the application recognition module is configured to determine the fields of interest based on the application associated with the traffic flow.

13. The system for classifying a device according to claim 10, wherein the system is further configured to:

determine at least one traffic action associated with the device classification; and apply the at least one traffic action to the network traffic flow.

14. The system for classifying a device according to claim 10, wherein the device type is classified based on one of a general device type or an operating system of the device.

15. The system for classifying a device according to claim 14, wherein the operating system is classified as one of: Windows OS, Android OS, and iOS.

16. The system for classifying a device according to claim 11 wherein a field extraction and lookup module is configured to determine standardized fields in the header.

17. The system for classifying a device according to claim 11 wherein a field extraction and lookup module is configured to determine maximum idle time or a maximum payload size in the header.

\* \* \* \* \*